United States Patent
Wright

(10) Patent No.: US 10,735,466 B2
(45) Date of Patent: Aug. 4, 2020

(54) REACTIVE AND PRE-EMPTIVE SECURITY SYSTEM FOR THE PROTECTION OF COMPUTER NETWORKS AND SYSTEMS

(71) Applicant: nChain Holdings Limited, St. John's (AG)

(72) Inventor: Craig Steven Wright, London (GB)

(73) Assignee: nChain Holdings Limited, St. Johns (AG)

( * ) Notice: Subject to any disclaimer, the term of this patent is extended or adjusted under 35 U.S.C. 154(b) by 161 days.

(21) Appl. No.: 16/079,076

(22) PCT Filed: Feb. 14, 2017

(86) PCT No.: PCT/IB2017/050811
§ 371 (c)(1),
(2) Date: Aug. 22, 2018

(87) PCT Pub. No.: WO2017/145001
PCT Pub. Date: Aug. 31, 2017

(65) Prior Publication Data
US 2019/0058733 A1    Feb. 21, 2019

(30) Foreign Application Priority Data
Feb. 23, 2016 (GB) .................................. 1603118.9

(51) Int. Cl.
*H04L 29/06*    (2006.01)
(52) U.S. Cl.
CPC ...... *H04L 63/1491* (2013.01); *H04L 63/1425* (2013.01)
(58) Field of Classification Search
CPC .................................................. H04L 63/1491
(Continued)

(56) References Cited

U.S. PATENT DOCUMENTS

| 8,661,102 B1 | 2/2014 | Steiner et al. |
| 10,050,779 B2 | 8/2018 | Alness et al. |

(Continued)

FOREIGN PATENT DOCUMENTS

| EP | 2942919 A1 | 11/2015 |
| JP | 2005004617 A | 1/2005 |

(Continued)

OTHER PUBLICATIONS

International Search Report and Written Opinion dated May 12, 2017, Patent Application No. PCT/IB2017/050811, filed Feb. 14, 2017, 9 pages.

(Continued)

*Primary Examiner* — Peter C Shaw
(74) *Attorney, Agent, or Firm* — Davis Wright Tremaine LLP

(57) ABSTRACT

The invention provides mechanisms for enhancing the security and protection of a computer-based system or network. It relates, in part, to the use of a decoy (which may be termed "honeypot" or "honeynet") for collecting attacker-related data, and/or diverting malicious behaviour away from legitimate resources. In one embodiment, the invention provides a method comprising the steps of receiving, processing and logging network traffic data of a plurality of users, where the network traffic is received from a plurality of participating users; determining an attacker profile from the network traffic data; determining a honeypot or honeynet configuration based on the attacker profile; and upon receipt of a valid information request from a user of the plurality of users, providing the determined attacker profile and configuration to the user. Additionally or alternatively, it may provide a computer-implemented method comprising the steps of receiving, processing and logging network traffic data; based on processed network traffic data: determining that network (Continued)

traffic originates from an attacker, determining a risk classification; and determining a decoy configuration based on the risk classification; upon receipt of a valid information request from a user, providing the determined risk classification and decoy configuration to the user.

15 Claims, 4 Drawing Sheets

(58) Field of Classification Search
USPC .......................................................... 726/23
See application file for complete search history.

(56) References Cited

U.S. PATENT DOCUMENTS

| | | |
|---|---|---|
| 2002/0133603 A1 | 9/2002 | Mitomo et al. |
| 2003/0217283 A1 | 11/2003 | Hrastar et al. |
| 2004/0128543 A1 | 7/2004 | Blake et al. |
| 2005/0166072 A1* | 7/2005 | Converse .......... H04W 12/1204 726/5 |
| 2006/0101515 A1 | 5/2006 | Amoroso et al. |
| 2006/0212942 A1 | 9/2006 | Barford et al. |
| 2006/0242701 A1 | 10/2006 | Black et al. |
| 2007/0067841 A1 | 3/2007 | Yegneswaran et al. |
| 2007/0094722 A1 | 4/2007 | Riordan |
| 2007/0094728 A1 | 4/2007 | Julisch et al. |
| 2007/0192863 A1 | 8/2007 | Kapoor et al. |
| 2007/0271614 A1 | 11/2007 | Capalik |
| 2008/0016570 A1* | 1/2008 | Capalik ............... H04L 63/1408 726/23 |
| 2009/0241173 A1 | 9/2009 | Troyansky |
| 2010/0071054 A1* | 3/2010 | Hart .................... H04L 63/1416 726/13 |
| 2010/0269175 A1 | 10/2010 | Stolfo et al. |
| 2011/0214182 A1 | 9/2011 | Adams et al. |
| 2013/0152199 A1 | 6/2013 | Capalik |
| 2013/0305357 A1 | 11/2013 | Ayyagari et al. |
| 2015/0106889 A1 | 4/2015 | Sharabani et al. |
| 2015/0229656 A1 | 8/2015 | Shieh |
| 2016/0044054 A1* | 2/2016 | Stiansen ............. H04L 63/1416 726/24 |
| 2016/0065614 A1 | 3/2016 | Stolfo et al. |
| 2016/0080414 A1 | 3/2016 | Kolton et al. |

FOREIGN PATENT DOCUMENTS

| | | |
|---|---|---|
| WO | 0223805 A2 | 3/2002 |
| WO | 2012011070 A1 | 1/2012 |
| WO | 2016005273 A1 | 1/2016 |

OTHER PUBLICATIONS

UK Commercial Search Report dated Apr. 11, 2016, Patent Application No. 1603118.9, filed Feb. 23, 2016, 3 pages.
UK Commercial Search Report with Expanded Report dated Jun. 29, 2016, Patent Application No. 1603118.9, filed Feb. 23, 2016, 5 pages.
UK IPO Search Report dated Oct. 4, 2016, Patent Application No. 1603118.9, filed Feb. 23, 2016, 4 pages.

* cited by examiner

REACTIVE AND PRE-EMPTIVE SECURITY SYSTEM FOR THE PROTECTION OF COMPUTER NETWORKS AND SYSTEMS

TECHNICAL FIELD

The present disclosure relates to computer network security, intrusion detection and intrusion protection. The invention is particularly suited for use in the monitoring, detection, response to and/or prevention of unauthorised access or misuse of computer-based devices or systems. Embodiments of the invention may relate to profiling attackers, and/or the use of computer-based decoys (honeypots/honeynets).

BACKGROUND

Intrusion detection systems (IDS) are used to monitor network activities for attackers. Reports are generated and alerts signalled to the owner or manager of the specific network. An intrusion detection system that responds to an attack, for example by blocking traffic using a firewall, may be referred to as an intrusion prevention system (IPS) or an intrusion detection and prevention system (IDPS). In some implementations, attacker traffic is detected by and/or routed to one or more honeypots.

Honeypots are network decoys that attract attackers with the aim of distracting the attackers from more valuable production machines on a network. Honeypots are often deployed within a network using unallocated addresses, and providing services and/or data to engage attackers. Because a honeypot has no production value and typically sits at an unallocated address, every attempt to contact a honeypot is suspect. This means that honeypots can be used to identify attacks, and consequently honeypots also enable the gathering of information about attacker behaviour and attacker identification while an attacker is exploiting a honeypot. Attackers, in turn, try to avoid honeypots by looking at behaviour (such as the services provided) to assess the likelihood of a target in a network being a honeypot.

Physical honeypots are real machines with their own IP addresses, and are therefore expensive to implement. Virtual honeypots, on the other hand, require fewer physical machines thereby reducing the cost. The operating system and services provided by a honeypot are configured according to the activity on the network and the intended purpose of the particular honeypot at that time. Because it is challenging, complex and time consuming to configure honeypots, dynamic virtual honeypots are used to automate configuration processes. Dynamic honeypots are able to discover the network (e.g. by fingerprinting), decide what honeypot configuration to use and then create and configure the honeypots.

Multiple honeypots can be combined to form a "honeynet"—a decoy network set up with intentional vulnerabilities. As with individual honeypots, the honeynet enables the owner/manager to observe and analyse an attacker's activities and use the gleaned information to strengthen the system's security mechanisms.

Background material relating in general to the technical field can be found in WO2012/011070 A1, US2015/0229656 A1, U.S. Pat. No. 8,661,102, US20060242701 US2007271614, US2007192863, US2011214182, US2013152199, US2015106889, US2016080414, US2016065614, US2006212942, JP2005004617, US20040128543 and US2010269175.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

With every new attacker or modified attacker behaviour, an IDPS will monitor attacker behaviour, update the logged data regarding the attacker, and also update a response strategy. For example, a certain attacker profile may result in a virtual honeypot being created for that attacker. The process is repeated for each new attacker, and may also be repeated if the attacker's behaviour or some aspect of the profile changes. This is a complex and time consuming process. It would be advantageous to have a simplified process of responding and updating a response to a detected attacker. By simplifying the process, security measures can be deployed more swiftly and in a more efficient manner. Moreover, there is a need for improved communications and transfer of data in respect of intruder detection systems. Such improvements would give rise to more effective protection systems which are better equipped to detect, prevent and respond to attacks.

Various aspects and embodiments of the invention provide such an improved security solution, resulting in enhanced protection for computer-based devices and networks, and also the data which is stored thereon. The invention may provide a reactive and pre-emptive security system. The system may be based on choice theory. It may be arranged for the protection of computing devices, networks and their associated data.

In accordance with the invention, there may be provided a computer-implemented method comprising:
receiving, processing and logging network traffic data;
determining an attacker profile from the network traffic data;
determining a honeypot or honeynet configuration based on the attacker profile; and
upon receipt of a valid information request from a user, providing the determined attacker profile and configuration to the user.

The network traffic data may be received from a plurality of users, and the plurality of users may include the said (requesting) user.

In order to improve the operation of a honeypot in a network it would be advantageous if the honeypot can be configured to attract and engage an attacker, preferably in a manner so that the honeypot is not easily identified by an attacker. One way of doing this is to reconfigure a honeypot according to updated information about an attacker. For example, a dynamic honeypot may be automatically updated to provide additional services based on logged attacker behaviour where the attacker requests services not previously provided by that honeypot.

The method may comprise the step of using a computer-based resource to store:
the network traffic data;
the attacker profile; the honeypot or honeynet configuration; and/or
data relating to the users.

Network traffic may be directed to a honeypot or honeynet generated in accordance with, or using, the determined configuration. The plurality of users may comprise users who are designated as valid, authorised or legitimate users. Some or all of the plurality of users may be registered with a system in accordance with the invention or otherwise indicated as authorised. A list of authorised users may be stored or maintained. The authorised users may be collaborating participants who agree to share and/or contribute data relating to network traffic.

The method may comprise the step of receiving a request from a user, and determining whether the request is from an authorised user or an attacker or otherwise unauthorised party.

The method may comprise the step of determining a profile for one or more of the users in the plurality of users.

The invention may also provide a computer implemented (security) system arranged to implement the method of any preceding claim, comprising: a computer-based storage resource, arranged to store network traffic data provided by a plurality of users of the system; a software component arranged to provide a honeypot or honeynet configuration to one or more legitimate users upon request, wherein the configuration is based upon an attacker profile that is based upon, or derived using, the network traffic data.

The storage resource may be arranged to store:
profile(s) relating to one or more of the plurality of users; and/or
profile(s) relating to one or more attackers or groups or types of attacker; and/or
honeypot/honeynet configuration parameters.

Various aspects of the invention may provide an intrusion detection and protection system (IDPS) (and corresponding methods). The method may comprise the steps of providing a database (or "repository"). The data base may store profiles for "normal" users i.e. legitimate and/or registered users. This may provide reference data relating to traffic, that may be of use or benefit to legitimate users. The database may store data (profiles) relating to known attackers or groups of attackers. It may store attacker classification data, code signatures etc. It may store attack prevention data such as, for example, honey pot/net configuration parameters).

The database may be managed by a data manager. Multiple users may communicate with the data manager, for example via a network. The centralised database may provide information, such as attacker signatures and/or profiles, to the users or their systems. This may enable users to match traffic on their networks with the supplied attacker profile(s) or signature(s). Implementing a shared repository with mutually beneficial information enables the participants to not only identify and respond to a current attacker, but also to effectively inoculate themselves against potential attackers based on data gathered by the other participants. In one or more embodiments, the participating users may register with or subscribe to repository.

The data manager may be a single computing device, or may be computing network that includes multiple computing devices or processors to allow for distributed computing, grid computing or cloud computing. The database may be connected to the data manager via a communication link. Alternatively, the database may be part of the data manager to reduce data process time. In other embodiments, the database may be connected to the data manager via a communication network. The communication network may be any form of known network, such as a wide area network (WAN). The database may operate according to a database management system (DBMS) running on the database. It may include multiple sub-databases that operate based on different DBMSes.

The data manager may manage the database by providing a number of services. These may include:
Receiving, processing and logging network traffic data received from users of the IDPS, and updating the centralised database with the network traffic data to form a single data resource sourced from multiple users' traffic data; and/or
Determining protection parameters, for example in the form of a honeypot configuration appropriate for a particular attacker; and/or
Providing users with access to the shared information on the centralised database, enabling the users to identify attackers and also to implement appropriate protection parameters.

The data manager may determine whether the request from the authorised user relates to a request for traffic profile data, or whether the purpose of the request is to provide traffic data for processing and logging.

Raw traffic data may be received by the data manager. This raw data may be logged as is, in an unprocessed form. Additionally or alternatively, it may also be processed in order to classify the traffic as relating to normal user traffic or attacker traffic. This may involve the use of any known detection method(s) and tool(s), including for example signature-based or anomaly-based detection, stateful detection and application-level detection.

The invention may comprise a system protection system (SPS) which may be in communication with the database. This may be direct communication with the database or may be via the data manager. The invention may be arranged to determine whether an incoming request originates from a legitimate participant (user) or an malicious/unauthorised third party (attacker). The invention may also be arranged to determine a response to the request. If a request is determined to be from an attacker, the invention may generate a virtual honeypot and/or honeynet (i.e. a decoy) and a database. The database may be an altered or false database. It may contain data which is not commercially or confidentially sensitive. It may be randomised data. The invention may be arranged to direct the source of the request to the honeypot and false database.

Where more than one attacker is identified, more than one honeypot and respective database may be generated. The parameters used to create and/or configure the honeypots may be determined locally by the SPS, based on attacker information received from the database. Alternatively or additionally, honeypot parameters may be obtained from the database. Other attacker profile data may also be obtained from the database.

Any feature(s) described above may also be applicable for the embodiment(s) described below.

Additionally or alternatively, the invention may provide a computer-implemented method comprising:
receiving attacker profile information;
monitoring traffic to a network address;
comparing the monitored traffic to the attacker profile information;
upon determining that the monitored traffic is associated with an attacker, retrieving configuration information for a computer decoy; and/or
configuring a computer decoy based on the retrieved configuration.

The attacker profile information may include the configuration information. Configuring the computer decoy may include creating the computer decoy and/or reconfiguring the computer decoy. The decoy may be referred to as a honey pot or honeynet.

Additionally or alternatively, there may be provided a computer-implemented method comprising:
receiving, processing and logging network traffic data; and/or based on processed network traffic data:

determining that network traffic originates from an attacker;
determining a classification of the network traffic; and
determining a decoy configuration based on the classification;
upon receipt of a request from a valid user, providing the determined classification and decoy configuration to the user. The request may be an information request.

Determining the classification may use supervised learning pattern recognition, for example multi-layer perceptrons (MLP). The classification may be an attacker classification, a computer system/network risk classification, or a traffic classification.

The classification may be a risk or severity classification associated with the sophistication of the attacker. For example, certain behaviour may be associated with an attacker that is deemed to be a relatively minor threat, whereas more sophisticated behaviour may be associated with an attacker that is deemed to be more potentially dangerous.

Determining the attacker classification may include classifying the type of traffic generated, or the type of attacker depending on a threshold associated with the attacker's behaviour, for example where the threshold is based on which services are requested by the attacker.

Additionally or alternatively, the risk characteristics of a particular computing system or local network may be determined from the network traffic, i.e. the risk of an attack given the system/network configuration in view of the network traffic characteristics.

Classification may be rule based, or may be done by processing the raw traffic data with a learning method such as a neural network, perceptrons, or a tree learning method e.g. using a random forest algorithm. For example, when using supervised learning pattern recognition based on a perceptron based neural network (e.g. multi-layer perceptrons MLP), an input layer with one neuron for each input may be used to map for IP Options, Malware and Buffer overflow conditions, selected attacks etc. The system of perceptrons may be processed using a hidden neuron layer in which each neuron represents combinations of inputs and calculates a response based on current data coupled with expected future data, a prior data and external systems data. Data processed at this level may feed into an output layer. The result of the neural network may supply the output, e.g. as a risk function. The perceptron may be used to model the selected risk factors for the invention and calculate a base risk that is trained and updated over time.

Any feature(s) described above in relation to one aspect or embodiment of the invention may also be applicable and relevant with regard to any other aspect or embodiment described above.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the disclosure are now described by way of example with reference to the accompanying drawings in which:—

In the drawings, like reference numerals designate similar parts.

DESCRIPTION OF ILLUSTRATIVE EMBODIMENTS

When a computer system or network is attacked, a typical response is to block the attack using a firewall, or in some instances to connect the attacker to a honeypot. The details of these attacks are not shared with other parties, so that every attack that is performed is handled independently. No information is shared with other groups, and this lack of sharing makes it simple and economical for attackers to implement the same attack strategy across multiple networks in order to find a vulnerable target.

Thus, there is a need for an improved security solution which provides enhanced protection for computer-based devices and networks, and also the data which is stored thereon.

Figure 1:
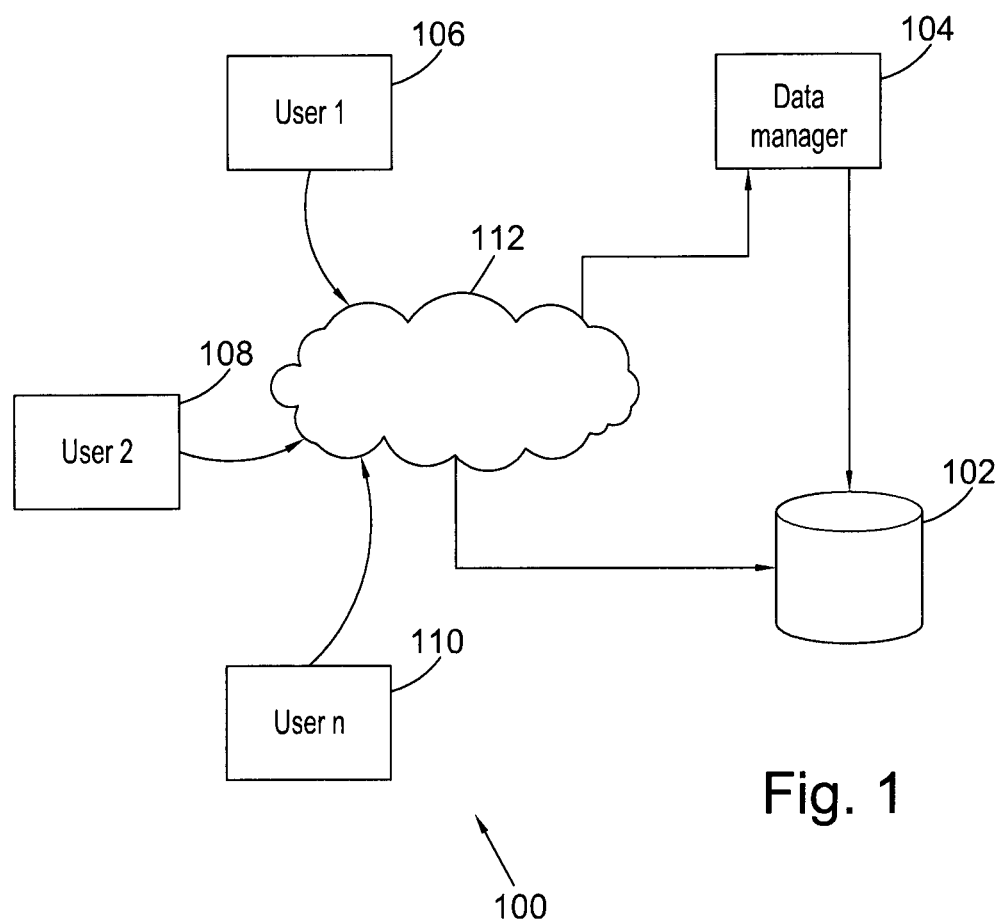
FIG. 1 is a schematic representation of an embodiment of an intrusion detection and protection system (IDPS).

FIG. 1 shows an intrusion detection and protection system (IDPS) 100 that addresses this shortcoming by providing a centralised database 102, managed by a data manager 104. Multiple users 106, 108, 110 communicate with the data manager 104, for example via a network 112. The centralised database 102 provides information, such as attacker signatures, to the individual systems of users 106, 108, 110 that are thereby able to match traffic on their networks with attacker profiles. Implementing a shared database with mutually beneficial information enables the subscribing users 106, 108, 110 to not only identify and respond to a current attacker, but also to effectively inoculate themselves against potential attackers based on data gathered by the other users.

The data manager 104 may be a single computing device, or may be computing network that includes multiple computing devices or processors to allow for distributed computing, grid computing or cloud computing.

The database 102 is shown in FIG. 1 as being connected to the data manager 104 via a communication link. However, the database 102 may be part of the data manager 104 to reduce data process time. In other examples, the database 102 may be connected to the data manager 104 via the communication network 112 without departing from the scope of the present disclosure.

The centralised database 102 operates according to a database management system (DBMS) running on the database 102. The DBMS may include Microsoft SQL, Oracle, Sybase, IBM DB2, MySQL, or Orient DB. The centralised database 102 may include multiple sub-databases that operate based on different DBMSes.

The communication network 112 is typically a wide area network (WAN), and may be implemented using any suitable type of network, such as a wireline network, a cellular communication network, a wireless local area network (WLAN), an optical communication network, etc. The communication network 112 may be a combination of the suitable networks, for example, the Internet. The communication network 112 can also be a private communication network that is built specifically for the IDPS 100.

Figure 2:
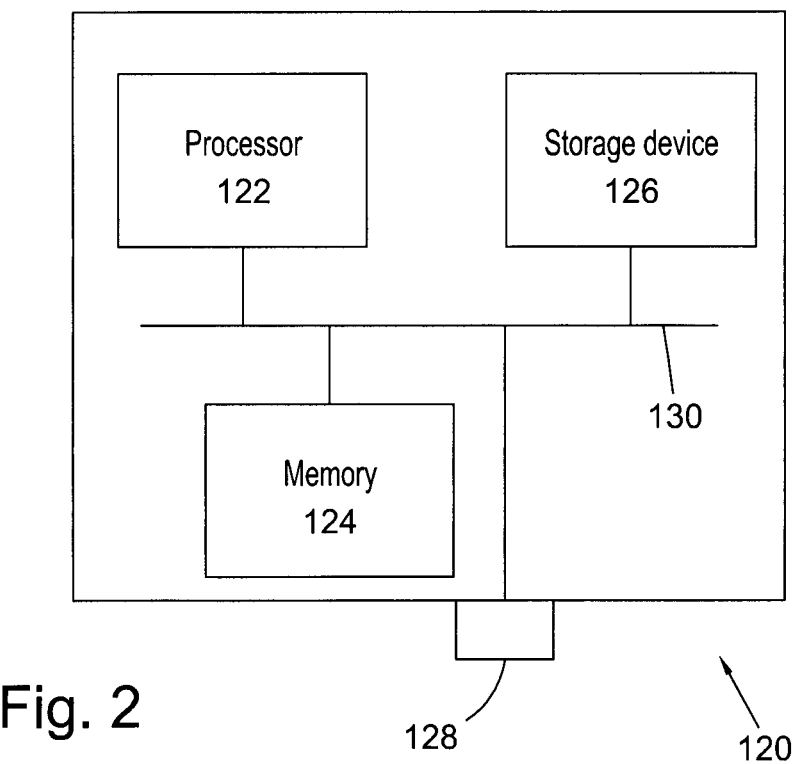
FIG. 2 illustrates an example computer system for traffic data management.

FIG. 2 illustrates an example computer system 120 for data management according to the present disclosure. The computer system 120 represents an example structure of the data manager 104 described above.

The computer system 120 includes a storage device 126, a memory device 124, a communication interface 128, and a processor 122. The computer 120 further includes a bus 130 that connects the storage device 126, the memory device 124, the communication interface 128, and the processor 122.

The storage device 126 is configured to store traffic data, the traffic data including normal user and attacker traffic data received from multiple users. Although the storage device 126 is shown as part of the computer system 120, the storage device 126 may be a separate entity that is connected to the computer system 120, for example, the centralised database 102 shown in FIG. 1.

Figure 4:
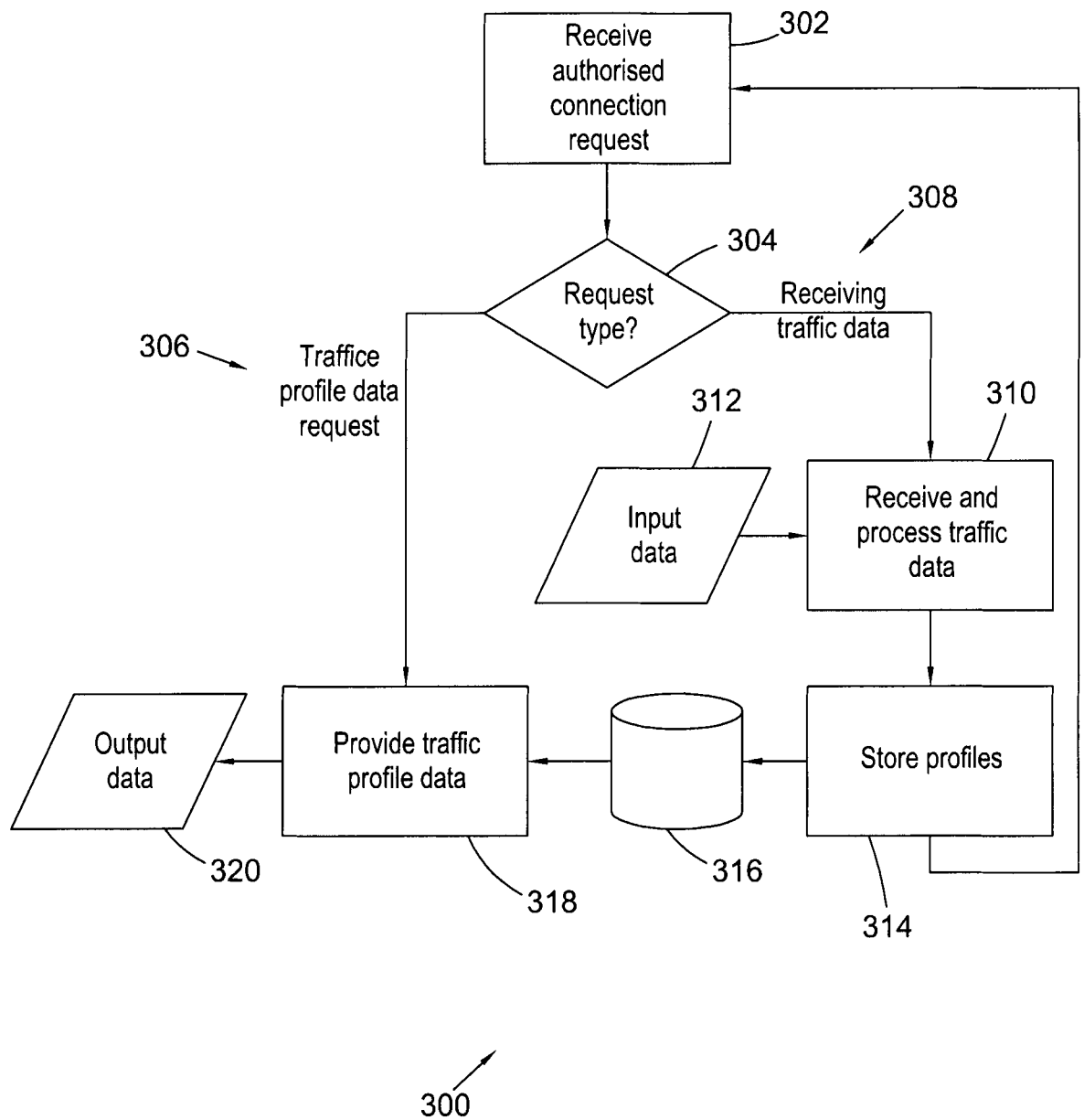
FIG. 4 is a flow diagram describing an embodiment of a method for providing an IDPS.
Figure 5:
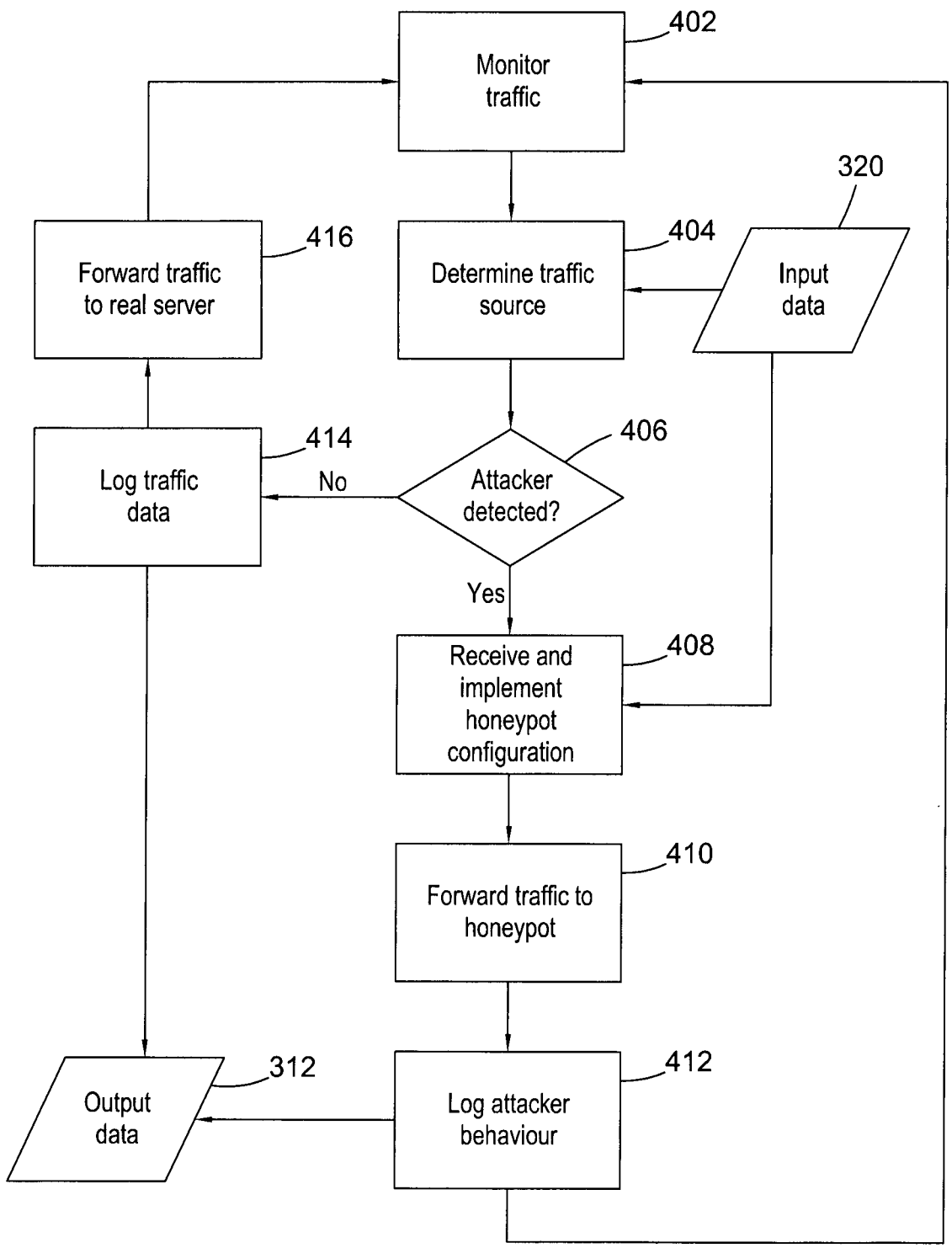
FIG. 5 is a flow diagram describing an embodiment of a method of using an intrusion detection and protection system.

The memory device 124 is configured to store instructions in relation to the operation of the data manager 104, as described elsewhere herein with reference to FIGS. 4 and 5. These instructions are implemented as machine-readable instructions included in a computer software program, when executed by the processor 122, causes the processor 122 to perform these methods of operating and using an IDPS.

The communication interface 128 is configured to connect to a communication network, particularly, the communication network 102 as shown in FIG. 1, via the link between the computer system 120 and the communication network 110.

The processor 122 is connected to the memory device 124, the storage device 126, and the communication interface 128. The processor 122 is configured to obtain the instructions from the memory device 124 in operating and using an IDPS.

In the example shown in FIG. 2, the storage device 126, the memory device 124 and the processor 122 are configured to operate according to a computer operating system, for example, Windows Server, Mac OS X Server, Linux, Unix, Windows, and Mac OS.

The processor 122 may be a general purpose Central Processing Unit (CPU), and the instructions stored in the memory device 124 are defined by one or more of the following programming languages: HyperText Markup Language (HTML), HTML5, JavaScript, and JQuery. The instructions may also be defined by one or more of the following programming languages: JAVA, Python, and PHP. The instructions may also be defined by one or more of the following programming languages: Objective-C, C++, C, and Swift.

Figure 3:
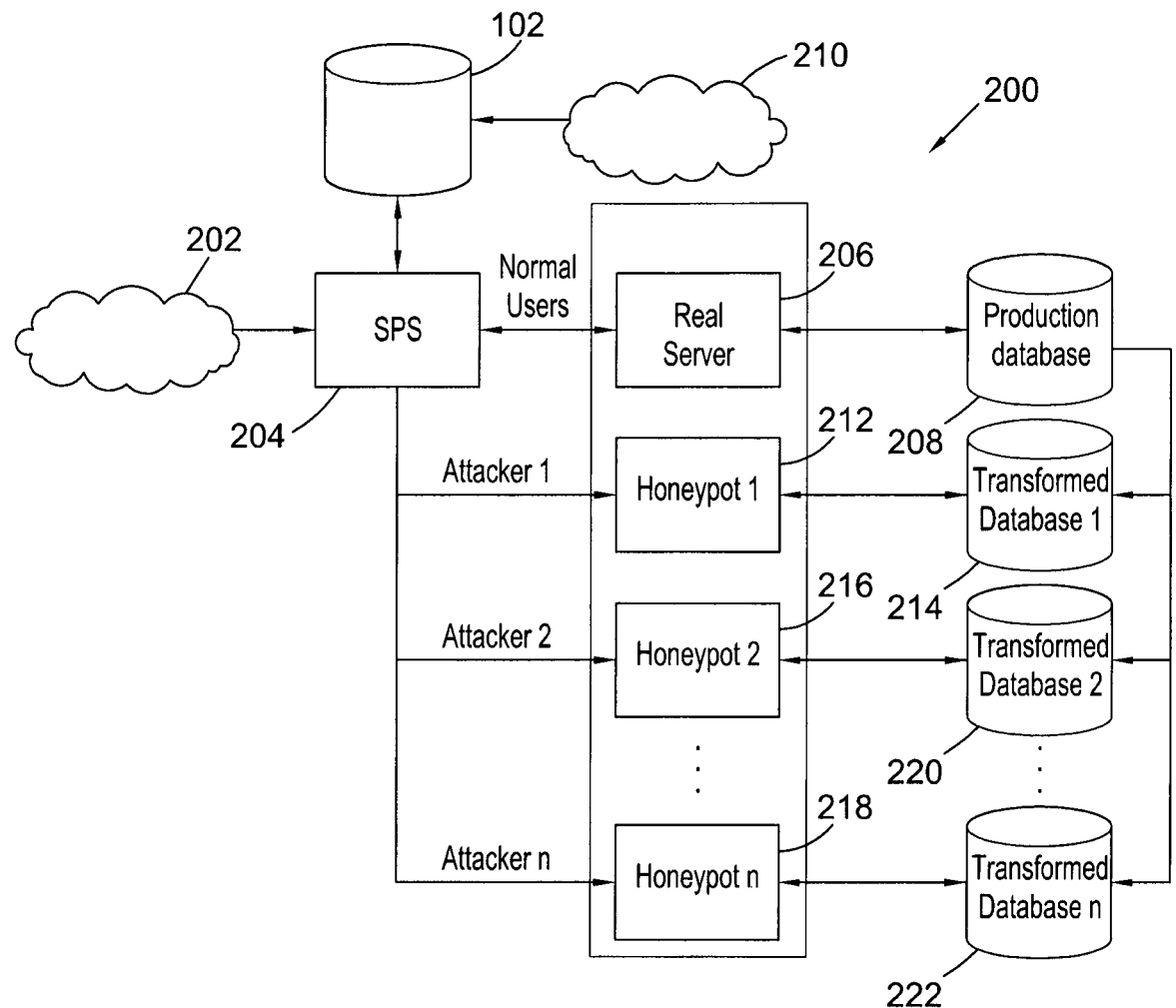
FIG. 3 is a schematic representation of an embodiment of an implementation of an IDPS.

FIG. 3 shows an example of a computer network 200 that uses an IDPS service as described above with reference to FIG. 1. In this example, user requests received from a network 202 pass via a server protection system (SPS) 204 to the computer network 200 where a real server 206 provides access to a production database 208. Of course many different types of networks offering different types of services can make use of an SPS in communication with an IDPS.

The SPS 204 may be implemented on a computer system like the example computer system 120 described above with reference to FIG. 2. The memory device 124 is then configured to store instructions in relation to the operation of the SPS 204. These instructions are implemented as machine-readable instructions included in a computer software program, when executed by the processor 122, causes the processor 122 to implement the SPS 204 as described below.

The SPS 204 has access to information from the centralised database 102. As indicated in FIG. 3, the centralised database 102 is updated using data from a community of users 210 as described above. The traffic pattern data from the database 102 is used by the SPS 204 to determine whether user requests received are from normal users or from attackers. If a user request is from an attacker, then the SPS 204 generates a virtual honeypot 212 and a transformed database 214, and directs the attacker to this honeypot 212 and a false database 214 that appears to be real.

Where more than one attacker is identified, more than one honeypot 216, 218 and respective transformed database 220, 222 may be generated. The parameters used to create and/or configure the honeypots may be determined locally by the SPS, based on attacker information received from the database 102. Alternatively or additionally honeypot parameters may be obtained from the database 102 together with the other attacker profile data.

The SPS 204 may communicate directly with the database 102 in order to retrieve information as required, as shown in the example illustrated in FIG. 3. In the example shown in FIG. 5 (described in more detail elsewhere herein), communication between the database 102 and the SPS 204 is via the data manager 104, and the data manager 104 manages the content and format in which information is provided to the SPS 204. One way of managing the services provided to the SPS 204 is according to a subscription service profile that the subscribing user (SPS owner) is associated with.

FIG. 4 is a flow diagram describing an example of a method 300 for providing an IDPS as shown in FIG. 1. At step 302 the data manager 104 receives a connection request from an authorised user, for example a subscribing SPS that is identified and authorised when the connection is made.

The data manager 104 manages the centralised database 102 by providing a number of services that include:

(1) Receiving, processing and logging network traffic data received from users of the IDPS, and updating the centralised database with the network traffic data to form a single data resource sourced from multiple users' traffic data;

(2) Determining protection parameters, for example in the form of a honeypot configuration appropriate for a particular attacker; and (3) Providing users with access to the shared information on the centralised database 102, enabling the users to identify attackers and also to implement appropriate protection parameters.

At step 304, the data manager 104 determines whether the connection request from the authorised user relates to a request for traffic profile data 306, or whether traffic data is being provided for processing and logging 308.

At step 310 raw traffic data 312 is received by the data manager 104. This raw data may be logged as is, but this data is also processed to determine a number of things.

Firstly, the data is analysed in order to classify the traffic as relating to normal user traffic or attacker traffic. Intrusion detection systems may rely on any number of detection methods and tools, including signature-based or anomaly-based detection, stateful detection and application-level detection. Anomaly-based detection may rely on thresholds selected to describe the local network environment, e.g. relating to network traffic volume, packet count, IP fragments, IPID, IP options, IP header information etc. For example, a typical indicator of attacker traffic is if the traffic is directed to an IP address that is not used or is restricted, or if a service is requested that is restricted or not provided by the targeted network. Other information extracted from the traffic data to determine whether the source is from an attacker may include one or more of the following: an IP address known from an IP address blacklist, code signatures associated with attackers, and network scan behaviour.

If it is determined that traffic is associated with an attacker, in some implementations it may also be possible to further analyse the data to ascertain the type or classification of an attacker. The classification may be a risk or severity classification associated with the sophistication of the attacker. For example, certain behaviour may be associated with a reduced threat attacker (e.g. a script kiddie if a vulnerability known to the owner is not exploited by the attacker), whereas more sophisticated behaviour may be associated with a more dangerous attacker (e.g. skilled hackers that uncover hidden indicators such as code signatures).

Determining the attacker classification may include classifying the type of traffic generated, or the type of attacker depending on a threshold associated with the attacker's behaviour, for example where the threshold is based on which services are requested by the attacker.

Additionally or alternatively, the risk characteristics of a particular computing system or local network may be determined from the network traffic, i.e. the risk of an attack given the system/network configuration in view of the network traffic characteristics.

Classification may be rule based, or may be done by processing the raw traffic data with a learning method such as a neural network, perceptrons, or a tree learning method e.g. using a random forest algorithm. For example, when using supervised learning pattern recognition based on a perceptron based neural network (e.g. multi-layer perceptrons MLP), an input layer with one neuron for each input is used to map for IP Options, Malware and Buffer overflow conditions, selected attacks etc. The system of perceptrons is processed using a hidden neuron layer in which each neuron represents combinations of inputs and calculates a response based on current data coupled with expected future data, a prior data and external systems data. Data processed at this level feeds into an output layer. The result of the neural network supplies the output, e.g. as a risk function. The perceptron is the computational workhorse in this system, and can be used to model the selected risk factors for the system and calculate a base risk that is trained and updated over time.

When monitoring the operation of a system or the actions of users, thresholds are characteristically defined above or below which alerting, alarms, and exceptions are not reported. This range of activity is regarded as baseline or routine activity. In this way, a risk function can be created that not only calculates data based on existing and known variables, but also updates automatically using external sources and trends. In this example, external sources refers to data gathered from the community of users 210 that provides external trending and correlation points.

Secondly, at step 310, in addition to determining the source of the traffic data (normal data vs. attacker data), the data manager 104 also determines an appropriate response, e.g. using a lookup table based on known features of the attacker behaviour. In some implementations the response includes the creation and/or configuration of a honeypot so that attacker traffic can be redirected thereby protecting the production network, and also providing an opportunity to extract more information about the particular attacker. At step 314, honeypot configuration parameters are stored in the database 316 together with the attacker profiles.

Profiles for normal users are also stored, providing reference traffic data for bona fide users.

If the connection request from the authorised user relates to a request for traffic profile data 306, then at step 318 the profile data is retrieved from the database 316 and a profile package 320 is provided to the authorised user.

The content of the profile package 320 depends on the information rights or requirements of the authorised user, as managed by the data manager 104. The profile package may be a comprehensive compilation of traffic data on the database 316, in which case direct access to all the information on the database may be provided to the user. Alternatively, the profile package may include only a portion of the traffic data depending on the relevance to or requirements of the particular user. For example, in one implementation, the data request may be for a particular attacker's profile (e.g. based on an originating IP address) and information associated with that attacker. For such a request, the profile package 320 includes information relating to the attacker identity (e.g. an attacker behaviour profile, attacker classification, code signatures etc.) and also includes attack prevention information (e.g. honeypot configuration parameters).

The data provided to the authorised user may also include other information available from the database, for example normal user profiles or attacker profiles in different formats (e.g. a specific attacker's profile or a group of attackers' profiles).

FIG. 5 shows a flow diagram of an example method 400 of implementing the IDPS 100. Locally, an SPS 204 is responsible for interfacing between a user system (for example users 106, 108 and 110 as shown in FIG. 1) and the data manager 104 of the IDPS 100. At step 402 the SPS 204 monitors the traffic, and based on the data 320 received from the IDPS determines the source of the traffic (normal user vs. attacker) at step 404. The IDPS data received is one or more profile packages as described above with reference to FIG. 4 so that if an attacker is identified at step 406, a protection response is implemented at step 408, based on information in the profile packages. The information includes, for example, honeypot configuration parameters provided by the IDPS. Once the honeypot has been created, configured and/or reconfigured the attacker's traffic is sent to the honeypot at step 410.

At step 412 the traffic data describing the attacker behaviour is logged by providing raw traffic data 312 to the IDPS. Similarly, if the source of the traffic is determined to be a normal user (and not an attacker), then this normal traffic data is logged at step 414. At step 416 the normal traffic is forwarded to the real server (e.g. real server 206 in FIG. 3).

Providing a central resource of shared traffic data improves the response time and efficiency of computer systems to attackers when compared to stand-alone systems reliant on a single source of information about attackers (i.e. their own network traffic).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented security method comprising: based on processed network traffic data:
   determining that network traffic originates from an attacker;
   determining a risk classification; and determining a decoy configuration based on the risk classification; and upon receipt of a valid information request from a user, providing the determined risk classification and decoy configuration to the user, wherein determining the risk classification uses supervised learning pattern recognition and wherein the supervised learning pattern recognition comprises using multi-layer perceptrons.

2. The method of claim 1, wherein the decoy configuration is based on network traffic data of a plurality of users and is available for use by the plurality of users.

3. The method of claim 1, and comprising the step of using a computer-based resource to store:
the network traffic data;
an attacker profile;
the decoy configuration; and/or
data relating to a plurality of users.

4. A method according to claim 1, and comprising the step of:
directing network traffic to a honeypot or honeynet generated in accordance with, or using, the determined decoy configuration.

5. A method according to claim 1, wherein the user is designated as authorised or a legitimate user.

6. A method according to claim 1, and comprising the step of:
receiving another request from the user, and determining whether the request is from an authorised user.

7. A method according to claim 1, further comprising the step:
determining a profile for the user.

8. A computer implemented security system arranged to implement the method of claim 1, comprising:
a computer-based storage resource, arranged to store network traffic data provided by a plurality of users of the system; and
a software component arranged to provide the decoy configuration to one or more legitimate users upon request, wherein the configuration is based upon an attacker profile that based upon, or derived using, the network traffic data.

9. A system according to claim 8, wherein the storage resource is also arranged to store:
profile(s) relating to one or more of a plurality of users;
profile(s) relating to one or more attackers or groups or types of attacker; and/or
decoy configuration parameters.

10. A computer-implemented method comprising:
based on processed network traffic data:
determining a risk classification related to network traffic determined to be from an attacker; and
determining a decoy configuration based on the risk classification; and
upon receipt of a valid information request from a user, providing the determined risk classification and decoy configuration to the user, wherein determining the risk classification uses supervised learning pattern recognition and wherein the supervised learning pattern recognition comprises using multi-layer perceptrons.

11. The method of claim 10, and further comprising the step of:
directing traffic to a computer decoy.

12. The method of claim 10, further comprising the step of:
storing attacker profile information for the attacker in a computer-based resource.

13. A method according to claim 12, wherein the attacker profile information is generated using network traffic data provided by a plurality of users.

14. A computer-implemented method comprising:
receiving, processing and logging network traffic data;
based on processed network traffic data:
determining that network traffic originates from an attacker;
determining a risk classification; and
determining a decoy configuration based on the risk classification; and
upon receipt of a valid information request from a user, providing the determined risk classification and decoy configuration to the user, wherein determining the risk classification uses supervised learning pattern recognition and wherein the supervised learning pattern recognition comprises using multi-layer perceptrons.

15. The method of claim 14, wherein the risk classification indicates a local network risk of failure.

* * * * *